(12) United States Patent
Mizushima et al.

(10) Patent No.: US 7,345,098 B2
(45) Date of Patent: Mar. 18, 2008

(54) WATER-BASED INK

(75) Inventors: Ryuma Mizushima, Wakayama (JP); Isao Tsuru, Wakayama (JP); Koji Azuma, Wakayama (JP); Takehiro Tsutsumi, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/329,349

(22) Filed: Dec. 27, 2002

(65) Prior Publication Data

US 2003/0144378 A1 Jul. 31, 2003

(30) Foreign Application Priority Data

Dec. 28, 2001 (JP) ............................. 2001-400010
Jun. 18, 2002 (JP) ............................. 2002-176872
Aug. 7, 2002 (JP) ............................. 2002-229952

(51) Int. Cl.
*C09D 11/00* (2006.01)

(52) U.S. Cl. .................. 523/160; 523/161; 106/31.28; 106/31.6; 524/556; 524/577; 524/612

(58) Field of Classification Search ................ 523/160, 523/161; 106/31.6, 31.28; 524/556, 577, 524/612
See application file for complete search history.

(56) References Cited

U.S. PATENT DOCUMENTS

| | | | |
|---|---|---|---|
| 6,011,098 A | | 1/2000 | Kashiwazaki et al. |
| 6,031,019 A | * | 2/2000 | Tsutsumi et al. ........... 523/160 |
| 6,034,154 A | | 3/2000 | Kase et al. |
| 6,225,370 B1 | * | 5/2001 | Suthar et al. ............... 523/160 |
| 6,740,690 B2 | * | 5/2004 | Nakano et al. ............. 523/160 |
| 2002/0077383 A1 | * | 6/2002 | Takao et al. ................ 523/160 |
| 2003/0081086 A1 | | 5/2003 | Suzuki et al. |
| 2003/0195274 A1 | * | 10/2003 | Nakamura et al. .......... 523/160 |
| 2005/0124726 A1 | | 6/2005 | Yatake et al. |

FOREIGN PATENT DOCUMENTS

| | | |
|---|---|---|
| EP | 1 113 051 | 7/2001 |
| EP | 1243623 A1 * | 9/2002 |
| EP | 1 266 941 | 12/2002 |
| JP | 6-306317 | 11/1994 |
| JP | 8-151544 | 6/1996 |
| JP | 8-176481 | 7/1996 |
| JP | 8-176488 | 7/1996 |
| JP | 8-218015 | 8/1996 |
| JP | 10-60345 | 3/1998 |
| JP | 10-60351 | 3/1998 |
| JP | 2000-144031 | 5/2000 |
| JP | 2003-033602 | 4/2003 |
| JP | 2003-138186 | 5/2003 |
| WO | WO 01/10918 | 2/2001 |
| WO | WO 01/30924 | 5/2001 |

OTHER PUBLICATIONS

Machine Translation of JP 10-060351 A (1998).*
Machine Translation of JP 10-060345 A (1998).*

* cited by examiner

*Primary Examiner*—Edward J. Cain
(74) *Attorney, Agent, or Firm*—Oblon, Spivak, McClelland, Maier & Neustadt, P.C.

(57) ABSTRACT

A water-based ink comprising an aqueous dispersion of polymer particles made of a water-insoluble vinyl polymer containing a colorant, wherein the water-insoluble vinyl polymer is prepared by polymerizing a monomer composition comprising a specific monomer A such as a monomer A1 represented by the formula (I):

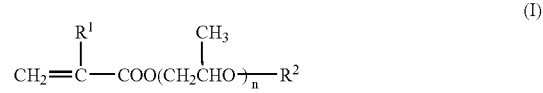

wherein $R^1$ is hydrogen or methyl, $R^2$ is hydrogen, alkyl or alkylphenyl, and n is 1 to 30; a monomer having a salt-forming group; and a monomer copolymerizable with the monomer A and the monomer having a salt-forming group. The water-based ink can be suitably used as a water-based ink for inkjet recording and the like.

23 Claims, No Drawings

WATER-BASED INK

BACKGROUND OF THE INVENTION

1. Field of the Invention

The present invention relates to a water-based ink. More specifically, the present invention relates to a water-based ink which can be suitably used as a water-based ink for inkjet recording and the like.

2. Discussion of the Related Art

Inkjet recording is a recording system for forming characters or images, comprising directly jetting ink droplets from very fine nozzles to a recording medium, and depositing the ink droplets on the recording medium. This system has some advantages such that not only the device shows excellent operability at a low level of noise, but also the coloration is facilitated and plain paper can be used as a recording medium. Therefore, this system has been widely used. As an ink used for inkjet printers, a pigment-based ink has been used in recent years in order to improve water resistance and light-fastness.

However, there are some defects in the pigment-based ink such that the pigment is less likely to remain on the surface of copy sheets, so that optical density is lowered. Also, when the content of the pigment in the ink is increased in order to improve optical density, there arise some defects such that the ink has a higher viscosity, so that the jetting property of the ink is lowered.

In order to increase the optical density of the pigment-based ink, there have been proposed addition of a polymer containing a polyethylene glycol (meth)acrylate monomer and an α,β-ethylenic unsaturated carboxylic acid (Japanese Patent Laid-Open No. Hei 6-306317), addition of a polymeric dispersant made of a polyethylene glycol (meth)acrylate monomer or a poly(trimethylene glycol) (meth)acrylate monomer (Japanese Patent Laid-Open No. 2000-144031), and the like. Also, in order to improve jetting stability of the pigment-based ink, there have been proposed addition of fine polymer particles (Japanese Patent Laid-Open No. Hei 8-218015, Hei 8-151544 and Hei 8-176488), addition of an ethylene oxide adduct (Japanese Patent Laid-Open No. Hei 8-176481), and the like.

However, there are some defects in the water-insoluble vinyl polymer prepared by polymerizing a (meth)acrylate monomer having an oxyethylene group or an oxytrimethylene group as a nonionic component, such that the water-insoluble vinyl polymer easily penetrates into copy sheets because the polymer itself is highly hydrophilic, thereby lowering optical density when printing, and the defects such that it is difficult to secure stable jetting property because the ink containing the polymer shows high viscosity.

An object of the present invention is to provide a water-based ink which is excellent in water resistance, light-fastness, rubbing resistance, gloss and dispersion stability.

Another object of the present invention is to provide a water-based ink for inkjet recording, which is excellent in jetting stability and capable of giving a printout high optical density.

These and other objects of the present invention will be apparent from the following description.

SUMMARY OF THE INVENTION

According to the present invention, there is provided:
(1) a water-based ink comprising an aqueous dispersion of polymer particles made of a water-insoluble vinyl polymer containing a colorant, wherein the water-insoluble vinyl polymer (hereinafter simply referred to as "polymer") is prepared by polymerizing a monomer composition comprising:
(A) at least one monomer A selected from the group consisting of a monomer A1 represented by the formula (I):

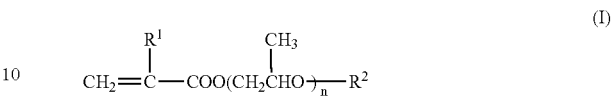

wherein $R^1$ is hydrogen atom or methyl group, $R^2$ is hydrogen atom, an alkyl group having 1 to 20 carbon atoms or an alkylphenyl group having 1 to 9 carbon atoms, and n is a number of 1 to 30 (hereinafter referred to as "monomer A1"), a monomer A2 represented by the formula (II):

wherein $R^1$, $R^2$ and n are as defined above, and m is a number of 1 to 30, wherein oxyethylene group and oxypropylene group are added in a block or random form (hereinafter referred to as "monomer A2"), and a monomer A3 represented by the formula (III):

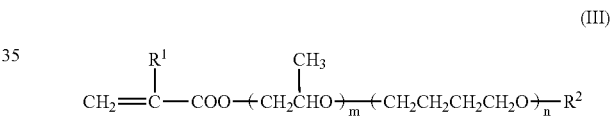

wherein $R^1$, $R^2$, m and n are as defined above, and oxyethylene group and oxypropylene group are added in a block or random form (hereinafter referred to as "monomer A3") [the monomer A is simply referred to as "monomer A"];
(B) a monomer having a salt-forming group (hereinafter referred to as "monomer having a salt-forming group B"); and
(C) a monomer copolymerizable with the monomer A and the monomer having a salt-forming group (hereinafter referred to as "copolymerizable monomer C").

The term "(meth)acrylic" as referred to herein means "acrylic" or "methacrylic."

DETAILED DESCRIPTION OF THE INVENTION

As the colorant, a pigment and a hydrophobic dye are preferable from the viewpoints of light-fastness and water resistance.

The pigment can be any of an inorganic pigment and an organic pigment. The pigment can be used together with an extender as occasion demands.

The organic pigment includes azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and the like.

Preferable examples of the organic pigment includes C.I. Pigment Yellow 13, 74, 83, 109, 110, 128 and 151; C.I. Pigment Red 48, 57, 122, 184 and 188; C.I. Pigment Violet 19; C.I. Pigment Blue 15, 15:1, 15:2, 15:3, 15:4 and 16; C.I. Pigment Green 7 and 36; and the like.

It has been known that the pigment-based ink using a pigment causes a phenomenon of exhibiting a color which is different from its original color due to the pigment particles existing on the surface of a printout, which is a so-called bronze phenomenon. This bronze phenomenon is changed by changing an angle at which a printout is observed, and is markedly exhibited when the printout is observed at an angle opposite to the angle of incidence. Therefore, the pigment-based ink has angular dependency of a color tone. On the other hand, a dye-based ink does not have any angular dependency. Therefore, there has been earnestly desired to develop a pigment-based ink not having an angular dependency.

In an ink set comprising three colors of cyan ink, magenta ink and yellow ink, there exists angular dependency of the color tone between each of the color inks. Among them, an ink most clearly showing a change in color tone is cyan ink. As the cyan ink, copper phthalocyanine pigments have been widely used. Among them, C.I. Pigment Blue 15:3 has been most widely used. However, the cyan ink in which C.I. Pigment Blue 15:3 is used has a large angular dependency.

To the contrary, when C.I. Pigment Blue 15:4, which has not been so frequently used in cyan ink, is used in place of C.I. Pigment Blue 15:3, and the cyan pigment is incorporated into the polymer particles, the angular dependency of the color tone is highly reduced.

Commercially available C.I. Pigment Blue 15:4 includes, for instance, a product commercially available from DAINIPPON INK & CHEMICALS, INC. under the trade name of Fastogen Blue TGR-1, a product commercially available from Toyo Ink Manufacturing Co., Ltd. under the trade name of LIONOL BLUE FG-7400-G, and the like.

The angular dependency of the color tone is evaluated by the following determination method.

Solid image printing is carried out on a gloss paper commercially available from SEIKO EPSON CORPORATION under the trade name of MC Gloss Paper and product number of KA420MK, and the paper is dried at 25° C. for 24 hours. Thereafter, the changing ratio a* of color tone is observed when a light-intercepting angle is varied from −80° to 80° at an angle of incidence of −45° by using a goniospectrophotometer commercially available from Murakami Color Research Laboratory under the product number of GCMS-4.

[Evaluation Criteria]

⊚: The maximum value of the changing ratio a* being less than 40.

○: The maximum value of the changing ratio a* being at least 40 and less than 50.

Δ: The maximum value of the changing ratio a* being at least 50 and less than 60.

X: The maximum value of the changing ratio a* being at least 60.

It is desired that the amount of the polymer is large from the viewpoint of reducing angular dependency of a color tone. However, when the amount of the polymer too large, the viscosity of the aqueous dispersion becomes high, so that viscosity of an ink exceeds an appropriate level. Therefore, the amount of the polymer is preferably 10 to 500 parts by weight, more preferably 20 to 200 parts by weight based on 100 parts by weight of C.I. Pigment Blue 15:4.

The inorganic pigment includes, for instance, carbon black, metal oxides, metal sulfides, metal chlorides and the like. Among them, carbon black is preferable in a black water-based ink. The carbon black includes furnace black, thermal lamp black, acetylene black, channel black and the like.

The extender includes silica, calcium carbonate, talc and the like.

The kind of the hydrophobic dye is not limited to specified ones so long as the hydrophobic dye can be incorporated into the polymer particles. Examples of the hydrophobic dye include oil-soluble dyes, disperse dyes and the like. The solubility of the hydrophobic dye in an organic solvent used for dissolving the hydrophobic dye for the preparation of the aqueous dispersion is preferably at least 2 g/L, more preferably 20 to 500 g/L at 20° C. from the viewpoint of efficiently incorporating the hydrophobic dye into the polymer particles.

The oil-soluble dye is not limited to specified ones, and includes, for instance, C.I. Solvent Black 3, 7, 27, 29 and 34; C.I. Solvent Yellow 14, 16, 29, 30, 56 and 82; C.I. Solvent Red 1, 3, 8, 18, 24, 27, 43, 49, 51, 72 and 73; C.I. Solvent Violet 3; C.I. Solvent Blue 2, 11 and 70; C.I. Solvent Green 3 and 7; C.I. Solvent Orange 2; nigrosine black dye and the like.

The disperse dye is not limited to specified ones, and includes C.I. Disperse Yellow 5, 42, 54, 64, 79, 82, 83, 93, 99, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; C.I. Disperse Green 6:1 and 9; and the like. Among them, C.I. Solvent Yellow 29 and 30 are preferable as a yellow dye, C.I. Solvent Blue 70 is preferable as a cyan dye, C.I. Solvent Red 18 and 49 are preferable as a magenta dye, and C.I. Solvent Black 3 and nigrosine black dye are preferable as a black dye.

Commercially available oil-soluble dyes include, for instance, oil-soluble dyes commercially available from Orient Chemical Co., Ltd. under the trade name of Nubian Black PC-8050, Oil Black HBB, Oil Black 860, Oil Yellow 129, Oil Yellow 105, Oil Pink 312, Oil Red 5B, Oil Scarlet 308, Vali Fast Blue 2606, Oil Blue BOS), oil-soluble dyes commercially available from BASF under the trade name of Neopen Yellow 075, Neopen Magenta SE1378, Neopen Blue 808, Neopen Blue FF4012, Neopen Cyan FF4238, and the like.

The amount of the colorant is preferably 20 to 1200 parts by weight, more preferably 50 to 900 parts by weight based on 100 parts by weight of the solid matters of the polymer from the viewpoints of optical density and easiness in incorporating the colorant into the polymer particles.

The polymer is obtained by polymerizing a monomer composition comprising (A) a monomer A, (B) a monomer having a salt-forming group B and (C) a copolymerizable monomer C.

The solubility of the polymer in water after neutralizing the salt-forming group is preferably at most 15% by weight, more preferably at most 10% by weight, still more preferably at most 5% by weight, especially preferably at most 1% by weight at 25° C. from the viewpoint of lowering the viscosity of the water-based ink.

When the monomer A1 is used in the polymer, a water-based ink which is excellent in jetting property can be obtained. The reason why excellent jetting property is exhibited is thought to be based on the fact that since hydrophobic interaction between oxypropylene group having high hydrophobicity of the monomer A1 and the colorant becomes stronger, the polymer exhibits stronger adsorption against the colorant. Therefore, the hydrophobicity of the polymer particles containing a colorant becomes stronger, thereby resulting in lowering the viscosity of the water-based ink.

Also, since the monomer A2 or monomer A3 is used in the polymer, the polymer gives the colorant excellent dispersion stability, and at the same time the polymer gives even stronger adsorption against the colorant as compared to a polymer obtained by copolymerizing with the monomer A1 or D. The reason why these excellent properties are exhibited is thought to be based on the fact that a hydrophobic hydration layer and a hydrophilic hydration layer having a highly hydrophilic oxyethylene group or an oxytetramethylene group are dispersed in the ink.

A water-based ink which forms a printed image having more excellent gloss can be obtained by using a monomer D in the polymer. The reason why a printed image having more excellent gloss can be formed is thought to be based on the fact that the hydrophilic hydration layer of highly hydrophilic oxyethylene group of the monomer D is dispersed in the water-based ink more widely than a polymer in which the monomer A2 or A3 is used.

In the formulae (I) to (IV), $R^1$ is hydrogen atom or methyl group.

$R^2$ is hydrogen atom, an alkyl group having 1 to 20 carbon atoms or an alkylphenyl group having 1 to 9 carbon atoms. Among them, it is more preferable to use a hydrophobic group such as an alkyl group rather than a hydrophilic group from the viewpoints of water resistance and dispersion stability of an emulsion. Among $R^2$, octyl group and nonylphenyl group are preferable from the viewpoints of water resistance and rubbing resistance.

m is a number of 1 to 30, and preferably a number of 2 to 25 from the viewpoints of jetting property and optical density.

n is a number of 1 to 30, and preferably a number of 2 to 25 from the viewpoints of jetting property and optical density.

In the monomer A2, oxyethylene groups and oxyethylene groups are added in a block or random form.

In the monomer A3, oxyethylene groups and oxytetramethylene groups are added in a block or random form.

Concrete examples of the monomer A1 includes polypropylene glycol mono(meth)acrylates and the like. Each of these monomers can be used alone or in admixture of at least two kinds.

Concrete examples of the monomer A2 include ethylene glycol.propylene glycol (meth)acrylate, poly(ethylene glycol.propylene glycol) mono(meth)acrylate, octoxypolyethylene glycol.polypropylene glycol mono(meth)acrylate, octoxypoly(ethylene glycol.polypropylene glycol) mono (meth)acrylate, stearoxypolyethylene glycol.polypropylene glycol mono(meth)acrylate, stearoxypoly(ethylene glycol.propylene glycol) mono(meth)acrylate, nonylphenoxypolyethylene glycol.polypropylene glycol mono(meth)acrylate, nonylphenoxypoly(ethylene glycol.propylene glycol) mono (meth)acrylate, and the like. These monomers can be used alone or in admixture of at least two kinds.

Concrete examples of the monomer A3 include propylene glycol.tetramethylene glycol mono(meth)acrylate, poly(propylene glycol.tetramethylene glycol) mono(meth)acrylate, propylene glycol.polybutylene glycol mono(meth)acrylate, poly(propylene glycol.butylene glycol) mono(meth)acrylate, and the like. These monomers can be used alone or in admixture of at least two kinds.

Among the monomers A1 to A3, polypropylene glycol mono(meth)acrylate, ethylene glycol.propylene glycol (meth)acrylate and poly(ethylene glycol.propylene glycol) mono(meth)acrylate are preferable from the viewpoint of viscosity of an ink and jetting property.

Examples of commercially available monomers A1 to A3 include monomers commercially available from NOF Corporation under the trade names of Blemmer PP-1000, PP-500, PP-800, AP-150, AP-400, AP-550, AP-800, 50PEP-300, PE-350, 70PEP-350B, AEP Series, 30PPT-800, 50PPT-800, 70PPT-800, APT Series, 10PPB-500B, 10APB-500B, 50POEP-800B, 50AOEP-800B, ASEP Series, PNEP Series, PNPE Series, 43ANEP-500, 70ANEP-550, and the like.

The content of the monomer A in the polymer is preferably 5 to 45% by weight, more preferably 5 to 35% by weight from the viewpoints of optical density and gloss of the printout.

As the monomer having a salt-forming group B, anionic monomers and cationic monomers are preferable. The anionic monomers and the cationic monomers can be used alone or in admixture of at least two kinds.

The anionic monomer includes at least one monomer selected from the group consisting of unsaturated carboxylic acid monomers, unsaturated sulfonic acid monomers and unsaturated phosphoric acid monomers.

The unsaturated carboxylic acid monomer includes, for instance, (meth)acrylic acid, crotonic acid, itaconic acid, maleic acid, fumaric acid, citraconic acid, 2-methacryloyloxymethyl succinic acid and the like. These monomers can be used alone or in admixture of at least two kinds.

The unsaturated sulfonic acid monomer includes, for instance, styrenesulfonic acid, 2-acrylamide-2-methylpropanesulfonic acid, 3-sulfopropyl (meth)acrylate, bis(3-sulfopropyl) itaconate and the like. These monomers can be used alone or in admixture of at least two kinds.

The unsaturated phosphate monomer includes, for instance, vinylphosphonic acid, vinyl phosphate, bis(methacryloxyethyl) phosphate, diphenyl-2-acryloyloxyethyl phosphate, diphenyl-2-methacryloyloxyethyl phosphate, dibutyl-2-acryloyloxyethyl phosphate and the like. These monomers can be used alone or in admixture of at least two kinds.

Among the anionic monomers, the unsaturated carboxylic acid monomers are preferable, and (meth)acrylic acid is more preferable from the viewpoints of viscosity of an ink and jetting property.

The cationic monomer includes at least one monomer selected from the group consisting of tertiary amine-containing unsaturated monomers and ammonium salt-containing unsaturated vinyl monomers.

The tertiary amine-containing unsaturated monomer includes, for instance, N,N-dimethylaminoethyl (meth)acrylate, N,N-dimethylaminopropyl (meth)acrylate, N,N-diethylaminoethyl (meth)acrylate, N,N-dimethylaminopropyl (meth)acrylamide, N,N-dimethylarylamine, vinylpyrrolidone, 2-vinylpyridine, 4-vinylpyridine, 2-methyl-6-vinylpyridine, 5-ethyl-2-vinylpyridine and the like. These can be used alone or in admixture of at least two kinds.

The ammonium salt-containing unsaturated vinyl monomer includes, for instance, quaternarized N,N-dimethylaminoethyl (meth)acrylate, quaternarized N,N-diethylaminoethyl (meth)acrylate, quaternarized N,N- dimethylaminopropyl (meth)acrylate and the like. These can be used alone or in admixture of at least two kinds.

Among these cationic monomers, N,N-dimethylaminoethyl (meth)acrylate, N,N-dimethylaminopropyl (meth)acrylamide and vinylpyrrolidone are preferable.

The content of the monomer having a salt-forming group B in the polymer is preferably 3 to 40% by weight, more preferably 5 to 30% by weight from the viewpoints of dispersion stability and jetting stability.

The copolymerizable monomer C includes, for instance, (meth)acrylates, aromatic group-containing monomers, macromers, and the like. These monomers can be used alone or in admixture of at least two kinds. It is preferable that the copolymerizable monomer C contains at least one member selected from the group consisting of aromatic group-containing monomers and macromers from the viewpoints of water resistance and rubbing resistance.

The (meth)acrylate includes, for instance, (meth)acrylates of which ester moiety has an alkyl group having 1 to 18 carbon atoms, such as methyl (meth)acrylate, ethyl (meth)acrylate, (iso)propyl (meth)acrylate, (iso or tertiary)butyl (meth)acrylate, (iso)amyl (meth)acrylate, cyclohexyl (meth)acrylate, benzyl (meth)acrylate, 2-ethylhexyl (meth)acrylate, (iso)octyl (meth)acrylate, (iso)decyl (meth)acrylate, (iso)dodecyl acrylate and (iso)stearyl (meth)acrylate. These (meth)acrylates can be used alone or in admixture of at least two kinds.

The above-mentioned "(iso or tertiary)" and "(iso)" include both of the case where these groups are present and the case where these groups are absent. When these groups are absent, the monomer is in the form of normal.

It is preferable that the aromatic ring-containing monomer is at least one monomer selected from the group consisting of styrene, vinylnaphthalene, α-methylstyrene, vinyltoluene, ethylvinylbenzene, 4-vinylbiphenyl, 1,1-diphenylethylene, benzyl (meth)acrylate, phenoxyethyl (meth)acrylate, 2-hydroxy-3-phenoxypropyl acrylate, 2-methacryloyloxyethyl-2-hydrpoxyprophyl phthalate, 2-acryloyloxyethyl phthalic acid and neopentyl glycol acrylate benzoate from the viewpoint of water resistance. Among them, at least one monomer selected from the group consisting of styrene, α-methylstyrene, vinyltoluene and vinylnaphthalene is preferable from the viewpoints of water resistance and rubbing resistance.

Representative examples of the macromer include a macromer having a polymerizable functional group at one end and a number-average molecular weight of preferably 500 to 500000, more preferably 1000 to 10000.

Concrete examples of the macromer include styrenic macromers having a polymerizable functional group at one end, silicone macromers having a polymerizable functional group at one end, methyl methacrylate macromers having a polymerizable functional group at one end, styrene-acrylonitrile macromers having a polymerizable functional group at one end, butyl acrylate macromers having a polymerizable functional group at one end, isobutyl methacrylate macromers having a polymerizable functional group at one end, and the like. Among them, the styrenic macromers having a polymerizable functional group at one end are preferable from the viewpoint of sufficiently incorporating the colorant into the polymer.

The styrenic macromer having a polymerizable functional group at one end includes a styrene homopolymer having a polymerizable functional group at one end, a copolymer of styrene and other monomer, having a polymerizable functional group at one end, and the like.

In the copolymer of styrene and other monomer, having a polymerizable functional group at one end, the other monomer includes, for instance, acrylonitrile and the like. The content of styrene in the copolymer is preferably at least 60% by weight, more preferably at least 70% by weight from the viewpoint of sufficiently incorporating a pigment into the copolymer.

Among the styrenic macromers having a polymerizable functional group at one end, styrenic macromers having an acryloyl group or a methacryloyl group as a polymerizable functional group are preferable.

Commercially available styrenic macromers include, for instance, styrenic macromers commercially available from TOAGOSEI CO., LTD. under the trade names of AS-6, AN-6, AN-6S, HS-6S, HS-6 and the like.

Among the silicone macromers, a silicone macromer represented by the formula (V):

$$X(Y)_q Si(R^3)_{3-r}(Z)_r \qquad (V)$$

wherein X is a polymerizable unsaturated group; Y is a divalent group; each of $R^3$ is independently hydrogen atom, a lower alkyl group, an aryl group or an alkoxy group; Z is a monovalent siloxane polymer residue having a number-average molecular weight of at least 500; q is 0 or 1; and r is an integer of 1 to 3, can be favorably used from the viewpoint of preventing scorching on the printer head of an inkjet printer.

In the silicone macromer represented by the formula (V), X is a polymerizable unsaturated group. Representative examples of the polymerizable unsaturated group include a monovalent unsaturated hydrocarbon group having 2 to 6 carbon atoms, such as $CH_2$=CH— group or $CH_2$=C($CH_3$)— group.

Y includes a divalent group. Representative examples of the divalent group include —COO— group, a —COO$_a$H$_{2a}$— group wherein a is an integer of 1 to 5, phenylene group and the like. Among them, —COOC$_3$H$_6$— is preferable.

Each of $R^3$ is independently hydrogen atom, a lower alkyl group, an aryl group or an alkoxy group.

Concrete examples of $R^3$ include hydrogen atom; a lower alkyl group having 1 to 5 carbon atoms, such as methyl group or ethyl group; an aryl group having 6 to 20 carbon atoms, such as phenyl group; an alkoxy group having 1 to 20 carbon atoms, such as methoxy group; and the like. Among them, methyl group is preferable.

Z is preferably a monovalent siloxane polymer residue having a number-average molecular weight of at least 500. Z is preferably a monovalent dimethylsiloxane polymer residue having a number-average molecular weight of 500 to 5000.

q is 0 or 1, and preferably 1. r is an integer of 1 to 3, and preferably 1.

Representative examples of the silicone macromer include a silicone macromer represented by the formula (VI):

$$CH_2=CR^1—COOC_3H_6—[Si(R^4)_2—O]_b—Si(R^4)_3 \qquad (VI)$$

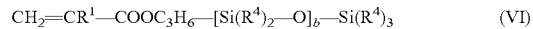

wherein $R^1$ is as defined above; each of $R^4$ is independently hydrogen atom or a lower alkyl group having 1 to 5 carbon atoms; and b is a number of 5 to 60;

a silicone macromer represented by the formula (VII):

$$CH_2=CR^1—COO—[Si(R^4)_2—O]_b—Si(R^4)_3 \qquad (VII)$$

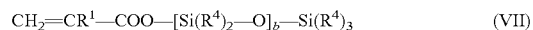

wherein $R^1$, $R^4$ and b are the same as defined above;

a silicone macromer represented by the formula (VIII):

$$CH_2=CR^1—Ph—[Si(R^4)_2—O]_b—Si(R^4)_3 \qquad (VIII)$$

wherein Ph is phenylene group; and $R^1$, $R^4$ and b are the same as defined above;

a silicone macromer represented by the formula (IX):

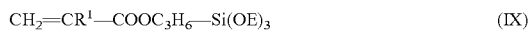

$$CH_2=CR^1-COOC_3H_6-Si(OE)_3 \qquad (IX)$$

wherein $R^1$ is the same as defined above; E is a group represented by the formula: $-[Si(R^1)_2-O]_c-Si(R^1)_3$ wherein $R^1$ is the same as defined above, and c is a number of 5 to 65;

and the like.

Among these silicone macromers, the silicone macromer represented by the formula (VI) is preferable, and a silicone macromer represented by the formula (X):

$$CH_2=C(CH_3)-COOC_3H_6-[Si(CH_3)_2-O]_d-Si(CH_3)_3 \qquad (X)$$

wherein d is a number of 8 to 40, is especially preferable. Examples of the commercially available silicone macromer include a silicone macromer commercially available from CHISSO CORPORATION under the trade name of FM-0711, and the like.

The number-average molecular weight of the macromer is determined by gel chromatography using polystyrene as a standard substance and chloroform containing 1 mmol/L dodecylmethylamine as a solvent.

The content of the copolymerizable monomer C in the polymer is preferably 15 to 87% by weight, more preferably 35 to 85% by weight from the viewpoints of optical density and water resistance.

Also, the content of the aromatic ring-containing monomer in the polymer is preferably 0.1 to 70% by weight, more preferably 1 to 50% by weight from the viewpoints of water resistance, rubbing resistance, viscosity of an ink and jetting stability.

The content of the macromer in the polymer is preferably 0.1 to 40% by weight, more preferably 1 to 30% by weight from the viewpoints of water resistance and rubbing resistance.

A representative example of the monomer D includes polyethylene glycol mono(meth)acrylate and the like.

Concrete examples of the monomer D include monomers commercially available from Shin-Nakamura Chemical Co., Ltd. under the trade names of NK ESTER M-20G, 40G, 90G and 230G; monomers commercially available from NOF Corporation under the trade names of Blemmer PE Series, PME-100, 200, 400, 1000 and the like.

The content of the monomer D in the polymer is preferably 5 to 45% by weight, more preferably 5 to 35% by weight from the viewpoints of optical density and viscosity of an ink.

The weight-average molecular weight of the polymer is preferably 3000 to 300000, more preferably 5000 to 200000 from the viewpoints of optical density and jetting stability. The weight-average molecular weight of the polymer is determined by the methods described in Preparation Examples 1 to 4 given below.

The polymer can be prepared by polymerizing a monomer composition by a known polymerization method such as a bulk polymerization method, a solution polymerization method, a suspension polymerization method or an emulsion polymerization method. Among these polymerization methods, the solution polymerization method is preferable.

The solvent used in the solution polymerization method is preferably a polar organic solvent. When the polar organic solvent is a water-miscible organic solvent, the water-miscible organic solvent can be also used in admixture with water.

The polar organic solvent includes, for instance, aliphatic alcohols having 1 to 3 carbon atoms, such as methanol, ethanol and propanol; ketones such as acetone and methyl ethyl ketone; esters such as ethyl acetate; and the like. Among them, methanol, ethanol, acetone, methyl ethyl ketone or a mixture of the solvent and water is preferable.

A radical polymerization initiator can be used in the polymerization. As the radical polymerization initiator, there can be used azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile) and 1,1'-azobis(1-cyclohexanecarbonitrile). Also, there can be used organic peroxides such as t-butyl peroxyoctoate, di-t-butyl peroxide and dibenzoyl oxide.

The amount of the polymerization initiator is preferably 0.001 to 5 mol, more preferably 0.01 to 2 mol per 1 mol of the monomer composition.

In the polymerization, a polymerization chain transfer agent can be used. Concrete examples of the polymerization chain transfer agent include mercaptans such as octyl mercaptan, n-dodecyl mercaptan, t-dodecyl mercaptan, n-tetradecyl mercaptan and 2-mercaptoethanol; xanthogenndisulfides such as dimethyl xanthogenndisulfide and diisopropyl xanthogenndisulfide; thiuram disulfides such as tetramethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, α-terpinene, γ-terpinene, diterpene, α-methylstyrene dimer, 9,10-dihydroanthracene, 1,4-dihydronaphthalene, indene and 1,4-cyclohexadiene; unsaturated heterocyclic compounds such as 2,5-dihydrofuran; and the like. Those polymerization chain transfer agents can be used alone or in admixture of at least two kinds.

The conditions for polymerizing the monomer composition cannot be absolutely determined because the conditions differ depending upon kinds of the radical polymerization initiator, the monomers and the solvent used, and the like. Usually, the polymerization temperature is preferably 30° to 100° C., more preferably 50° to 80° C., and the polymerization time is preferably 1 to 20 hours. It is preferable that the atmosphere for polymerization is an inert gas such as nitrogen gas.

After the termination of the polymerization reaction, the formed polymer can be isolated from the reaction solution by a known method such as re-precipitation or solvent distillation.

The formed polymer can be purified to remove unreacted monomers and the like from the polymer by the repeat of re-precipitation, membrane separation, a chromatographic method, an extraction method or the like.

The aqueous dispersion of the polymer particles containing a hydrophobic dye can be prepared by a known emulsification method. Specifically, the aqueous dispersion of the polymer can be obtained by dissolving the polymer and the hydrophobic dye in an organic solvent, adding a neutralizing agent as occasion demands to the resulting solution to ionize the salt-forming group of the polymer, adding water thereto, thereafter dispersing the resulting solution as occasion demands with a disperser or an ultrasonic emulsifier, and distilling off the organic solvent to phase-invert to a water-based system.

As a method for preparing an aqueous dispersion of the polymer particles containing a pigment, there is desired a method comprising dissolving the polymer in an organic solvent, adding the pigment, water and a neutralizing agent and a surfactant as occasion demands to the resulting solution, kneading the resulting mixture, diluting the kneaded mixture with water as occasion demands, and distilling off the organic solvent to give a water-based system.

As the organic solvent, alcoholic solvents, ketone solvents and ether solvents are preferable. Among these organic solvents, hydrophilic organic solvents are more preferable.

The alcoholic solvent includes, for instance, methanol, ethanol, isopropanol, n-butanol, tertiary butanol, isobutanol, diacetone alcohol and the like.

The ketone solvent includes, for instance, acetone, methyl ethyl ketone, diethyl ketone, methyl isobutyl ketone and the like. The ether solvent includes, for instance, dibutyl ether, tetrahydrofuran, dioxane and the like. Among these solvents, isopropanol, acetone and methyl ethyl ketone are preferable.

Also, the above-mentioned organic solvent and a hydrophilic organic solvent having a high boiling point can be used together as occasion demands. The hydrophilic organic solvent having a high boiling point includes, for instance, phenoxyethanol, ethylene glycol monomethyl ether, diethylene glycol monomethyl ether, diethylene glycol monoethyl ether, diethylene glycol diethyl ether, and the like.

As the neutralizing agent, an acid or a base can be used depending upon the kind of the salt-forming group of the polymer. The acid includes, for instance, inorganic acids such as hydrochloric acid and sulfuric acid; and organic acids such as acetic acid, propionic acid, lactic acid, succinic acid, glycollic acid, gluconic acid and glyceric acid. The base includes, for instance, tertiary amines such as trimethylamine and triethylamine, ammonia, sodium hydroxide, potassium hydroxide and the like.

The neutralization degree is not limited to specified ones. It is preferable that the resulting aqueous dispersion is usually neutral, for instance the pH of the aqueous dispersion is 4.5 to 10.

The average particle diameter of the polymer particles made of the water-insoluble polymer containing a colorant is preferably 0.01 to 0.50 μm, more preferably 0.02 to 0.30 μm, still more preferably 0.05 to 0.20 μm from the viewpoints of prevention of clogging of nozzles and dispersion stability. The average particle diameter of the polymer particles is intended to mean "average particle diameter before storage" as explained in Examples mentioned below. The average particle diameter of the polymer particles is determined by the method explained in the Examples.

The amount of the aqueous dispersion of the polymer particles in the water-based ink of the present invention is usually controlled so that the content of the polymer particles in the water-based ink becomes preferably 0.5 to 30% by weight, more preferably 1 to 15% by weight from the viewpoints of optical density and jetting stability.

In the water-based ink of the present invention, ingredients other than he polymer particles are substantially water. If necessary, there can be contained additives such as a wetting agent, a dispersant, a defoaming agent, a mildew proof agent and a chelating agent in the water-based ink. The water-based ink is obtained by mixing the aqueous dispersion of polymer particles, the additive, water and other ingredients as occasion demands, and filtering the resulting mixture as occasion demands.

The wetting agent includes, for instance, polyhydric alcohols or ethers thereof such as ethylene glycol, propylene glycol, diethylene glycol, triethylene glycol, polyethylene glycol, glycerol, diethylene glycol diethyl ether and diethylene glycol mono-n-butyl ether; acetates; and nitrogen-containing compounds such as N-methyl-2-pyrrolidone and 1,3-dimethylimidazolidinone. The amount of the wetting agent in the water-based ink is preferably 0.1 to 50% by weight, more preferably 0.1 to 30% by weight.

As the dispersant, there can be used anionic, nonionic, cationic and amphoteric dispersants.

The water-based ink of the present invention has a low viscosity and is excellent in jetting property and dispersion stability since the water-based ink of the present invention shows high hydrophobicity on the basis of the function of a hydrophobic hydration layer of oxypropylene groups ascribed to the monomer A1, A2 or A3. Therefore, the water-based ink of the present invention can be suitably used as a water-based ink for inkjet recording.

When a pigment or a hydrophobic dye is used as the colorant for the water-based ink of the present invention, a printout having excellent light-fastness and water resistance can be obtained from the water-based ink.

Furthermore, when at least one member selected from the group consisting of the aromatic ring-containing monomers and the macromers is used for the polymer in the water-based ink of the present invention, there can be obtained a printout having more excellent water resistance and rubbing resistance from the water-based ink.

Also, since the water-based ink of the present invention shows high hydrophobicity, the impregnation of the ink into paper having a hydrophilic surface is inhibited and the colorant can be effectively retained on the surface of the paper. As a result, a printout having a high optical density can be obtained.

EXAMPLES

Preparation Examples 1 to 4 and Comparative Preparation Example 1

[Preparation of Polymer Solution]

A reaction vessel was charged with 20 parts by weight of methyl ethyl ketone, 0.03 parts by weight of a polymerization chain transfer agent (2-mercaptoethanol) and 10% by weight of the amount of each monomer shown in Table 1, and the ingredients were mixed. Nitrogen gas replacement was sufficiently carried out, to give a mixed solution.

On the other hand, a dropping funnel was charged with 90% of the amount of each monomer shown in Table 1. The amount 0.27 parts by weight of a polymerization chain transfer agent (2-mercaptoethanol), 60 parts by weight of methyl ethyl ketone and 1.2 parts by weight of 2,2'-azobis (2,4-dimethylvaleronitrile) were added thereto, and the ingredients were mixed. Nitrogen gas replacement was sufficiently carried out to give a mixed solution.

The temperature of the mixed solution inside the reaction vessel was increased to 65° C. with stirring under nitrogen atmosphere, and the mixed solution inside the dropping funnel was gradually added dropwise to the reaction vessel over a period of 3 hours. After 2 hours passed from the termination of dropwise addition at 65° C., a solution prepared by dissolving 0.3 parts by weight of 2,2'-azobis(2, 4-dimethylvaleronitrile) in 5 parts by weight of methyl ethyl ketone was added thereto. The mixture was further aged at 65° C. for 2 hours and then at 70° C. for 2 hours, to give a polymer solution.

A part of the resulting polymer solution was isolated by drying the solution at 105° C. for 2 hours under reduced pressure to remove the solvent. The weight-average molecular weight was determined by gel permeation chromatography using polystyrene as a standard substance, and chloroform containing 1 mmol/L of dodecydimethylamine as a solvent. The results are shown in Table 1.

The details of the compounds shown in Table 1 are as follows:

Polypropylene glycol monomethacrylate: commercially available from Aldrich, Japan K.K. (number-average molecular weight: 375); in the formula (I), $R^1$ is methyl group and $R^2$ is hydrogen atom;

Poly(ethylene glycol.propylene glycol) monomethacrylate: commercially available from NOF Corporation under the trade name of Blemmer 50PEP-300; in the formula (II), m is 3.5, n is 2.5, $R^1$ is methyl group, and $R^2$ is hydrogen atom, and oxypropylene groups and oxyethylene groups are being added in a random form;

Poly(propylene glycol.tetramethylene glycol) monomethacrylate: commercially available from NOF Corporation under the trade name Blemmer 30PPT-800B; in the formula (III), m is 4, n is 8, $R^1$ is methyl group, and $R^2$ is hydrogen atom, and oxypropylene groups and oxytetramethylene groups are being added in a random form;

Polyethylene glycol monomethacrylate: commercially available from NOF Corporation under the trade name of Blemmer PE-350; in the formula (IV), m is 8, $R^1$ is methyl group, and $R^2$ is hydrogen atom; and Styrenic macromer: commercially available from TOA-GOSEI CO., LTD. under the trade name of AN-6 (styrene-acrylonitrile copolymerized macromer), styrene content: 75% by weight, number-average molecular weight: 6000, polymerizable functional group: methacryloyl group.

[Preparation of Aqueous Dispersion]

Five parts by weight of a polymer obtained by drying each polymer solution under reduced pressure was dissolved in 45 parts by weight of methyl ethyl ketone. A given amount of a neutralizing agent (20% aqueous sodium hydroxide) was added thereto to neutralize a salt-forming group. Further, 20 parts by weight of a quinacridone pigment [C.I. Pigment Red 122, commercially available from DAINIPPON INK & CHEMICALS, INC. under the trade name of Fastogen Super Magenta R] was added, and the resulting mixture was kneaded with a beads-mill for 2 hours.

One-hundred and twenty parts by weight of ion-exchanged water were added to the resulting kneaded mixture with stirring. Thereafter, methyl ethyl ketone was removed at 60° C. under reduced pressure, and a part of water was further removed, to give an aqueous dispersion of vinyl polymer particles containing a pigment, the solid content of which was 20% by weight.

TABLE 1

| Prep. Ex. No. | 1 | 2 | 3 | 4 | Comp. Prep. Ex. 1 |
|---|---|---|---|---|---|
| Monomer Composition (parts by weight) | | | | | |
| Polypropylene Glycol Monomethacrylate | 25 | 0 | 0 | 25 | 0 |
| Poly(ethylene glycol• propylene glycol) Monomethacrylate | 0 | 25 | 0 | 0 | 0 |
| Poly(propylene glycol• tetramethylene glycol) Monomethacrylate | 0 | 0 | 25 | 0 | 0 |
| Polyethylene Glycol Monomethacrylate | 0 | 0 | 0 | 0 | 25 |

TABLE 1-continued

| Prep. Ex. No. | 1 | 2 | 3 | 4 | Comp. Prep. Ex. 1 |
|---|---|---|---|---|---|
| Methacrylic Acid | 12 | 12 | 12 | 12 | 12 |
| Styrene Monomer | 63 | 63 | 63 | 48 | 63 |
| Styrenic Macromer | 0 | 0 | 0 | 15 | 0 |
| Weight-Average Molecular Weight | 55000 | 50000 | 52000 | 54000 | 54000 |
| Degree of Neutralization (%) | 100 | 100 | 100 | 100 | 100 |

Examples 1 to 4 and Comparative Example 1

Forty parts by weight of the aqueous dispersion of vinyl polymer particles containing a pigment obtained in Preparation Examples 1 to 4 and Comparative Preparation Example 1, 10 parts by weight of glycerol, 5 parts by weight of 2-pyrrolidone, 2 parts by weight of isopropyl alcohol and 43 parts by weight of ion-exchanged water were mixed together. The resulting mixture was filtered with a 25-mL needle-less syringe [commercially available from TERUMO CORPORATION] equipped with a 0.5 μm filter [acetyl cellulose membrane, outer diameter: 2.5 cm, commercially available from Fuji Photo Film Co., Ltd.], thereby removing coarse grains, to give a water-based ink.

Comparative Example 2

Twenty parts by weight of a quinacridone pigment [C.I. Pigment Red 122] was added to 50 parts by weight of methyl ethyl ketone, and the resulting mixture was kneaded with a beads-mill for 2 hours.

One-hundred and twenty parts by weight of ion-exchanged water was added to the resulting kneaded mixture with stirring. Thereafter, methyl ethyl ketone was removed at 60° C. under reduced pressure, and a part of water was further removed, to give an aqueous dispersion of pigment particles, the solid content of which was 20% by weight.

The same procedures as in Example 1 were carried out except that the resulting aqueous dispersion of pigment particles was used in place of the aqueous dispersion of vinyl polymer particles containing a pigment, to give a water-based ink.

The details of the water-based inks obtained in each Example and each Comparative Example are shown in Table 2.

TABLE 2

| Ex. No. | 1 | 2 | 3 | 4 | Comp. Ex. 1 | Comp. Ex. 2 |
|---|---|---|---|---|---|---|
| Aqueous Dispersion | Prep. Ex. 1 | Prep. Ex. 2 | Prep. Ex. 3 | Prep. Ex. 4 | Comp. Prep. Ex. 1 | None |
| Solid Content of Aqueous Dispersion of Vinyl Polymer Particles Containing Pigment | (8.0) | (8.0) | (8.0) | (8.0) | (8.0) | — |
| Quinacridone Pigment | — | — | — | — | — | (6.4) |
| Glycerol | (10.0) | (10.0) | (10.0) | (10.0) | (10.0) | (10.0) |
| 2-Pyrrolidone | (5.0) | (5.0) | (5.0) | (5.0) | (5.0) | (5.0) |

TABLE 2-continued

| Ex. No. | 1 | 2 | 3 | 4 | Comp. Ex. 1 | Comp. Ex. 2 |
|---|---|---|---|---|---|---|
| Isopropyl Alcohol | (2.0) | (2.0) | (2.0) | (2.0) | (2.0) | (2.0) |
| Ion-Exchanged Water | (75.0) | (75.0) | (75.0) | (75.0) | (75.0) | (76.6) |

(Note)
(1) The number in the parentheses is expressed by parts by weight.
(2) Prep. Ex. No. or Comp. Prep. Ex. No. listed in the row of "Aqueous Dispersion" means that the aqueous dispersion obtained in the Preparation Example or Comparative Preparation Example was used.

Next, the physical properties of each of the water-based inks obtained were evaluated in accordance with the following methods. The results are shown Table 3.

(1) Viscosity of Ink

The viscosity of an ink was determined at 20° C. at 100 r/min using RE80L VISCOMETER (Rotor 1) commercially available from Toki Sangyo K.K., and evaluated on the basis of the following evaluation criteria.

[Evaluation Criteria]
⊙: Viscosity of an ink being less than 3.5 mpa·s
○: Viscosity of an ink being at least 3.5 mPa·s and less than 4.5 mPa·s
Δ: Viscosity of an ink being at least 4.5 mPa·s and less than 7.0 mPa·s
X: Viscosity of an ink being at least 7.0 mPa·s (2) Jetting Property Using bubble jet printer commercially available from HEWLETT PACKARD under the model number of Desk Jet-720C, and the jetting property of an ink was evaluated on the basis of the following evaluation criteria.

[Evaluation Criteria]
○: Excellently jetting in all the nozzles
Δ: Jetting failure in a part of nozzles
X: Jetting failure (3) Optical Density Solid image printing was carried out on a commercially available copy paper using the above-mentioned printer, and the printed image was allowed to stand at 25° C. for 1 hour. Thereafter, its optical density was determined by using a Macbeth densitometer (commercially available from Macbeth Process Measurements Co. under the Product Number of RD914), and evaluated on the basis of the following evaluation criteria.

[Evaluation Criteria]
⊙: Optical density being at least 1.2
○: Optical density being at least 1.1 and less than 1.2
Δ: Optical density being at least 1.0 and less than 1.1
X: Optical density being less than 1.0

(4) Light-Fastness

The printed image by the solid image printing which was used for determining the optical density mentioned above was irradiated for 10000 counts consecutively using a xenon Fade-O-meter (commercially available from ATLAS, trade name). Thereafter, the optical density of the same printed portion as that before irradiation was determined again by using the Macbeth densitometer RD914. The residual ratio of the optical density after irradiation to the optical density before irradiation was determined by the equation:

[Residual Ratio]=[Optical Density after Irradiation]/[Optical Density before Irradiation]×100

The light-fastness was evaluated on the basis of the following evaluation criteria.

[Evaluation Criteria]
⊙: Residual ratio being at least 95%
○: Residual ratio being at least 80% and less than 95%
Δ: Residual ratio being at least 60% and less than 80%
X: Residual ratio being less than 60%

(5) Water Resistance

Solid image printing was carried out on a commercially available copy paper using the above-mentioned printer, and the printed image was dried at 25° C. for 1 hour. The optical density of the specified printed portion of the obtained sample was determined, and thereafter the printed copy paper was immersed vertically in stand-still water for 10 seconds, and the paper was lifted vertically therefrom. After air-drying the paper at 25° C. for 24 hours, the optical density of the same printing portion as that before immersion was determined. The residual ratio of the optical density after immersion to the optical density before immersion was determined by the following equation:

[Residual Ratio]=[Optical Density after Immersion]/[Optical Density before Immersion]×100

The water resistance was evaluated on the basis of the following evaluation criteria.

[Evaluation Criteria]
⊙: Residual ratio being at least 95%
○: Residual ratio being at least 80% and less than 95%
Δ: Residual ratio being at least 60% and less than 80%
X: Residual ratio being less than 60%

(6) Rubbing Resistance

Solid image printing was carried out on a commercially available copy paper using the above-mentioned printer. After the copy paper was dried at 25° C. for 24 hours, the printed surface was strongly rubbed with a finger. The extent of rub-off of the printed image was evaluated on the basis of the following evaluation criteria.

[Evaluation Criteria]
⊙: No printed image being rubbed off at all
○: Substantially no printed image being rubbed off, and its periphery being not stained
Δ: Some printed image being rubbed off, its periphery being slightly stained, and finger also being slightly stained
X: Printed image being considerably rubbed off, its periphery being considerably stained, and finger also being considerably stained (7) Average Particle Diameter and Dispersion Stability The average particle diameter of the polymer particles containing a colorant which were contained in an ink (hereinafter referred to as the average particle diameter before storage) was determined using a laser particle analyzer system (commercially available from Otsuka Denshi K.K. under the trade name of ELS-8000). The ink was stored for 1 month in a thermostat kept at 60° C., and thereafter the average particle diameter (hereinafter referred to as the average particle diameter after storage) was determined in the same manner as the above.

As an index for dispersion stability, the degree of dispersion stability was determined by the following equation:

[Degree of Dispersion Stability]=[Average Particle Diameter after Storage]/[Average Particle Diameter before Storage]×100

The degree of dispersion stability was evaluated on the basis of the following evaluation criteria.

TABLE 3

| Evaluation Item | Ex. 1 | Ex. 2 | Ex. 3 | Ex. 4 | Comp. Ex. 1 | Comp. Ex. 2 |
|---|---|---|---|---|---|---|
| Viscosity of Ink | ⊚ | ○ | ○ | ○ | X | X |
| Jetting Property | ○ | ○ | ○ | ○ | Δ | X |
| Optical Density | ⊚ | ○ | ○ | ⊚ | X | X |
| Light-Fastness | ○ | ○ | ○ | ○ | ○ | X |
| Water Resistance | ○ | ○ | ○ | ⊚ | Δ | X |
| Rubbing Resistance | ○ | ○ | ○ | ⊚ | X | X |
| Average Particle Diameter (μm) | 0.16 | 0.15 | 0.15 | 0.16 | 0.24 | 0.30 |
| Dispersion Stability | ○ | ⊚ | ⊚ | ○ | Δ | X |

[Evaluation Criteria]
⊚: Degree of dispersion stability being at least 95% and less than 105%
○: Degree of dispersion stability being at least 90% and less than 95%, or at least 105% and less than 110%
Δ: Degree of dispersion stability being at least 70% and less than 90%, or at least 110% and less than 130%
X: Degree of dispersion stability being less than 70% or at least 130%

It can be seen from the results shown in Table 3 that all of the water-based inks obtained in the Examples are excellent in jetting property since each of these inks has a low viscosity, respectively, so that printouts having a high optical density are formed. Also, it can be seen that the water-based inks obtained in the Examples give a printout being excellent in light-fastness, water resistance and rubbing resistance. Further, it can be seen that the water-based inks themselves are excellent in dispersion stability.

Preparation Examples 5 to 9 and Comparative Preparation Examples 2 and 3

[Preparation of Polymer Solution]

A reaction vessel was charged with 20 parts by weight of methyl ethyl ketone, 0.03 parts by weight of a polymerization chain transfer agent (2-mercaptoethanol) and 10% by weight of the amount of each monomer shown in Table 4, and the ingredients were mixed. Nitrogen gas replacement was sufficiently carried out, to give a mixed solution.

On the other hand, a dropping funnel was charged with the remaining 90% of the amount of each monomer shown in Table 4. The amount 0.27 parts by weight of a polymerization chain transfer agent (2-mercaptoethanol), 60 parts by weight of methyl ethyl ketone and 1.2 parts by weight of 2,2'-azobis(2,4-dimethylvaleronitrile) were then added thereto, and the ingredients were mixed. Nitrogen gas replacement was sufficiently carried out, to give a mixed solution.

The temperature of the mixed solution inside the reaction vessel was increased to 65° C. with stirring under nitrogen atmosphere, and the mixed solution inside the dropping funnel was gradually added dropwise to the reaction vessel over a period of 3 hours. After 2 hours passed from the termination of dropwise addition at 65° C., a solution prepared by dissolving 0.3 parts by weight of 2,2'-azobis(2,4-dimethylvaleronitrile) in 5 parts by weight of methyl ethyl ketone was added thereto. The mixture was further aged at 65° C. for 2 hours and then at 70° C. for 2 hours, to give a polymer solution.

A part of the resulting polymer solution was isolated by drying the solution at 105° C. for 2 hours under reduced pressure to remove the solvent. The weight-average molecular weight was determined by gel permeation chromatography using polystyrene as a standard substance, and chloroform containing 1 mmol/L of dodecydimethylamine as a solvent. The results are shown in Table 4.

The details of the compounds shown in Table 4 are as follows:

Polypropylene glycol monomethacrylate: commercially available from Aldrich, Japan K.K. (number-average molecular weight: 375); in the formula (I), $R^1$ is methyl group and $R^2$ is hydrogen atom;

Polypropylene glycol monomethacrylate (n=9): commercially available from NOF Corporation under the trade name of Blemmer PP-500; in the formula (I), $R^1$ is methyl group and $R^2$ is hydrogen atom;

Poly(ethylene glycol.propylene glycol) monomethacrylate: commercially available from NOF Corporation under the trade name of Blemmer 50PEP-300; in the formula (II), m is 3.5, n is 2.5, $R^1$ is methyl group, and $R^2$ is hydrogen atom; a monomer in which oxypropylene groups and oxyethylene groups are being added in a random form;

Poly(propylene glycol.tetramethylene glycol) monomethacrylate: commercially available from NOF Corporation under the trade name Blemmer 30PPT-800; in the formula (III), m is 4, n is 8, $R^1$ is methyl group, and $R^2$ is hydrogen atom; a monomer in which oxypropylene groups and oxytetramethylene groups are being added in a random form.

Polyethylene glycol monomethacrylate (m=9): commercially available from Shin-Nakamura Chemical Co., Ltd. under the trade name of NK ESTER M-90G; in the formula (IV), m is 9, and $R^1$ and $R^2$ are methyl groups; and Polyethylene glycol monomethacrylate (m=23): commercially available from Shin-Nakamura Chemical Co., Ltd. under the trade name of NK ESTER M230G; in the formula (IV), m is 23, and $R^1$ and $R^2$ are methyl groups; and Styrenic macromer: commercially available from TOAGOSEI CO., LTD. under the trade name of AN-6 (styrene-acrylonitrile copolymerized macromer), styrene content: 75% by weight, number-average molecular weight: 6000, polymerizable functional group: methacryloyl group

[Preparation of Aqueous Dispersion]

Five parts by weight of a polymer obtained by drying each polymer solution under reduced pressure was dissolved in 45 parts by weight of methyl ethyl ketone. A given amount of a neutralizing agent (20% aqueous sodium hydroxide) was added thereto to neutralize a salt-forming group. Further, 20 parts by weight of a quinacridone pigment [C.I. Pigment Red 122, commercially available from DAINIPPON INK & CHEMICALS, INC. under the trade name of Fastogen Super Magenta R] was added, and the resulting mixture was kneaded with a beads-mill for 2 hours.

One-hundred and twenty parts by weight of ion-exchanged water was added to the resulting kneaded mixture with stirring. Thereafter, methyl ethyl ketone was removed at 60° C. under reduced pressure, and a part of water was further removed, to give an aqueous dispersion of vinyl polymer particles containing a pigment, the solid content of which was 20% by weight.

TABLE 4

| Prep. Ex. No. | 5 | 6 | 7 | 8 | 9 | Comp. Prep. Ex. 2 | Comp. Prep. Ex. 3 |
|---|---|---|---|---|---|---|---|
| Monomer Composition (parts by weight) | | | | | | | |
| Polypropylene Glycol Monomethacrylate (Number-average molecular weight: 375) | 15 | 0 | 0 | 0 | 0 | 0 | 25 |
| Polypropylene Glycol Monomethacrylate (n = 9) | 0 | 0 | 0 | 15 | 15 | 0 | 0 |
| Poly(ethylene glycol•propylene glycol) Monomethacrylate | 0 | 15 | 0 | 0 | 0 | 0 | 0 |
| Poly(propylene glycol•tetramethylene glycol) Monomethacrylate | 0 | 0 | 15 | 0 | 0 | 0 | 0 |
| Polyethylene Glycol Monomethacrylate (m = 9) | 10 | 10 | 10 | 0 | 0 | 25 | 0 |
| Polyethylene Glycol Monomethacrylate (m = 23) | 0 | 0 | 0 | 10 | 10 | 0 | 0 |
| Methacrylic Acid | 12 | 12 | 12 | 12 | 14 | 12 | 12 |
| Styrene Monomer | 63 | 63 | 63 | 48 | 36 | 63 | 63 |
| Styrenic Macromer | 0 | 0 | 0 | 15 | 15 | 0 | 0 |
| n-Butyl Methacrylate | 0 | 0 | 0 | 0 | 10 | 0 | 0 |
| Weight-Average Molecular Weight of Vinyl Polymer | 52500 | 53000 | 54000 | 45000 | 70000 | 54000 | 55000 |
| Degree of Neutralization (%) | 100 | 100 | 100 | 100 | 100 | 100 | 100 |

Examples 5 to 8 and Comparative Examples 3 and 4

Forty parts by weight of the aqueous dispersion of vinyl polymer particles containing a pigment obtained in Preparation Examples 5 to 8 and Comparative Preparation Examples 2 and 3, 10 parts by weight of glycerol, 5 parts by weight of 2-pyrrolidone, 2 parts by weight of isopropyl alcohol and 43 parts by weight of ion-exchanged water were mixed together. The resulting mixture was filtered with a 25-mL needle-less syringe [commercially available from TERUMO CORPORATION] equipped with a 0.5 μm filter [acetyl cellulose membrane, outer diameter: 2.5 cm, commercially available from Fuji Photo Film Co., Ltd.], thereby removing coarse grains, to give a water-based ink having the composition shown in Table 5.

Example 9

The amount 12.5 parts by weight of a polymer obtained by drying the polymer solution obtained in Preparation Example 8 under reduced pressure was dissolved in 45 parts by weight of methyl ethyl ketone. A given amount of a neutralizing agent (20% aqueous sodium hydroxide) was added thereto to neutralize a salt-forming group. Further, 12.5 parts by weight of a phthalocyanine pigment [C.I. Pigment Blue 15:4, commercially available from TOYO INK MFG. CO., LTD. under the trade name of LIONOL BLUE FG-7400-G] was added, and the resulting mixture was kneaded with a beads-mill for 2 hours.

The resulting kneaded mixture was treated in the same manner as in Example 5, to give a water-based ink having components shown in Table 5.

Example 10

The amount 7.5 parts by weight of a polymer obtained by drying the polymer solution obtained in Preparation Example 9 under reduced pressure was dissolved in 45 parts by weight of methyl ethyl ketone. A given amount of a neutralizing agent (20% aqueous sodium hydroxide) was added thereto to neutralize a salt-forming group. Further, 22.5 parts by weight of an isoindolinone pigment [C.I. Pigment Yellow 110, commercially available from Ciba Specialty Chemicals K.K., trade name: CROMOPHTAL Yellow 3RT] were added, and the resulting mixture was kneaded with a beads-mill for 2 hours.

The resulting kneaded mixture was treated in the same manner as in Example 5, to give a water-based ink having components shown in Table 5.

TABLE 5

| Ex. No. | 5 | 6 | 7 | 8 | 9 | 10 | Comp. Ex. 3 | Comp. Ex. 4 |
|---|---|---|---|---|---|---|---|---|
| Amount of Each Component (parts by weight) | | | | | | | | |
| Kind of Polymer | Prep. Ex. 5 | Prep. Ex. 6 | Prep. Ex. 7 | Prep. Ex. 8 | Prep. Ex. 8 | Prep. Ex. 9 | Comp. Prep. Ex. 2 | Comp. Prep. Ex. 3 |
| Solid Content of Aqueous Dispersion of Polymer Particles Containing Pigment | 8.0 | 8.0 | 8.0 | 8.0 | 8.0 | 8.0 | 8.0 | 8.0 |
| Glycerol | 10.0 | 10.0 | 10.0 | 10.0 | 10.0 | 10.0 | 10.0 | 10.0 |
| 2-Pyrrolidone | 5.0 | 5.0 | 5.0 | 5.0 | 5.0 | 5.0 | 5.0 | 5.0 |

TABLE 5-continued

| Ex. No. | 5 | 6 | 7 | 8 | 9 | 10 | Comp. Ex. 3 | Comp. Ex. 4 |
|---|---|---|---|---|---|---|---|---|
| Isopropyl Alcohol | 2.0 | 2.0 | 2.0 | 2.0 | 2.0 | 2.0 | 2.0 | 2.0 |
| Ion-Exchanged Water | 75.0 | 75.0 | 75.0 | 75.0 | 75.0 | 75.0 | 75.0 | 75.0 |

(Note)
Prep. Ex. No. or Comp. Prep. Ex. No. listed in the row of "Aqueous Dispersion" means that the aqueous dispersion obtained in the Preparation Example or Comparative Preparation Example was used.

Next, jetting stability and gloss of each of the water-based inks obtained were determined in accordance with the following methods, and the other physical properties were evaluated in accordance with the methods described above. The results are shown Table 6.

(1) Jetting Stability

The jetting stability was evaluated on the basis of the following evaluation criteria by jetting an ink from a printer using an inkjet printer (commercially available from EPSON, under the Model Number of EM900C).

[Evaluation Criteria]
○: Excellently jetting in all the nozzles
Δ: Jetting failure in a part of nozzles
X: Jetting failure (2) Gloss Solid image printing was carried out on a commercially available MC gloss paper using the above-mentioned printer, and the printed image was allowed to stand at 25° C. for 1 hour, and thereafter its gloss was determined by using a glossmeter commercially available from Nippon Denshoku Kogyo K.K. under the trade name of HANDY GLOSSMETER with the product number of PG-1, and evaluated on the basis of the following evaluation criteria.

[Evaluation Criteria]
◎: Gloss being at least 40
○: Gloss being at least 35 and less than 40
Δ: Gloss being at least 30 and less than 35
X: Gloss being less than 30

TABLE 6

| Ex. No. | 5 | 6 | 7 | 8 | 9 | 10 | Comp. Ex. 3 | Comp. Ex. 4 |
|---|---|---|---|---|---|---|---|---|
| Physical Properties of Water-Based Ink | | | | | | | | |
| Viscosity of Ink | ◎ | ○ | ○ | ○ | ○ | ○ | X | ◎ |
| Jetting Stability | ○ | ○ | ○ | ○ | ○ | ○ | X | ○ |
| Gloss | ○ | ◎ | ○ | ○ | ○ | ○ | X | X |
| Optical Density | ◎ | ○ | ◎ | ◎ | ○ | ○ | X | ◎ |
| Light-Fastness | ○ | ○ | ○ | ○ | ○ | ○ | ○ | ○ |
| Water Resistance | ○ | ○ | ○ | ○ | ○ | ○ | Δ | ○ |
| Rubbing Resistance | ○ | ○ | ○ | ◎ | ◎ | ○ | X | ○ |
| Average Particle Diameter (μm) | 0.16 | 0.15 | 0.16 | 0.15 | 0.12 | 0.12 | 0.24 | 0.16 |
| Dispersion Stability | ◎ | ○ | ○ | ◎ | ◎ | ○ | Δ | ○ |

It can be seen from the results shown in Table 6 that all of the water-based inks obtained in Examples are excellent in jetting stability since each of the inks has a low viscosity, respectively, so that a printout having a high optical density and a glossy printed image are formed on a gloss paper, so that the water-based inks are excellent in light-fastness, water resistance and rubbing resistance, and also in dispersion stability.

Since the water-based ink of the present invention is excellent in water resistance, light-fastness, rubbing resistance, gloss, dispersion stability and jetting stability, the water-based ink can give a high optical density. Therefore, the water-based ink can be suitably used as a water-based ink for inkjet recording.

What is claimed is:

1. A water-based ink comprising an aqueous dispersion of polymer particles comprising a water-insoluble vinyl polymer containing a colorant, wherein the water-insoluble vinyl polymer is prepared by polymerizing a monomer composition comprising:

(i) a monomer (A) represented by the formula (III):

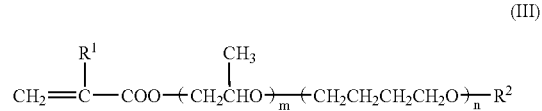

(III)

wherein $R^1$ is hydrogen atom or methyl group, $R^2$ is hydrogen atom, m is a number of 1 to 30, and n is a number of 1 to 30, and the oxytetramethylene and the oxypropylene group are present in a block or random form;

(ii) a monomer (B) having a salt-forming group;

(iii) a monomer (C) copolymerizable with the monomer (A) and the monomer (B), and (iv) a monomer (D) copolymerizable with the monomer (A), the monomer (B), and the monomer (C), and represented by the formula (IV):

(IV)

wherein $R^1$ and $R^2$ are as defined above, and m is a number of 1 to 30, wherein the monomer (A) is present in an amount of from 5 to 45 % by weight, the monomer (B) is present in an amount of from 3 to 40% by weight, the monomer (C) is present in an amount of from 15 to 87% by weight, and the monomer (D) is present in an amount of from 5 to 35% by weight in the water-insoluble vinyl polymer, wherein % by weight is based on the total weight of the water-insoluble vinyl polymer.

2. The water-based ink according to claim 1, wherein the colorant is a pigment or a hydrophobic dye.

3. The water-based ink according to claim 1, wherein the monomer (C) comprises at least one monomer selected from the group consisting of an aromatic ring-containing monomer and a macromer.

4. The water-based ink according to claim 1, wherein the monomer (C) is at least one aromatic ring-containing monomer selected from the group consisting of styrene, α-methylstyrene, vinyltoluene and vinylnaphthalene.

5. The water-based ink according to claim 1, wherein the monomer (C) is a styrenic macromer having a polymerizable functional group at one end.

6. The water-based ink according to claim 1, wherein the weight-average molecular weight of the water-insoluble vinyl polymer is from 3000 to 300000.

7. The water-based ink according to claim 1, wherein the monomer (B) is an unsaturated carboxylic acid.

8. The water-based ink according to claim 1, wherein the polymer consists of polymerized monomer units (A), (B), (C) and (D).

9. The water-based ink according to claim 1, wherein the polymer comprises polymerized units of poly(propylene glycol.tetramethylene glycol) mono(meth)acrylate; methacrylic acid; styrene; and polyethylene glycol monomethacrylate.

10. A process comprising
    jetting ink droplets onto a recording medium,
    wherein the ink droplets comprise the water-based ink according to claim 1.

11. A water-based ink comprising an aqueous dispersion of polymer particles comprising a water-insoluble vinyl polymer containing a colorant,
    wherein the water-insoluble vinyl polymer is prepared by polymerizing a monomer composition comprising:
    (i) at least one monomer (A) represented by the formula (I):

(I)

wherein $R^1$ is hydrogen atom or methyl group, $R^2$ is a hydrogen atom, and n is a number of 1 to 30, (ii) at least one monomer (B) having a salt-forming group;
(iii) at least one monomer (C) copolymerizable with the monomer (A) and the monomer (B);
(iv) at least one monomer (D) copolymerizable with the monomer (A), the monomer (B), and the monomer (C), and represented by formula (IV):

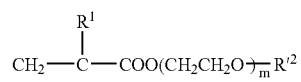
(IV)

wherein $R^1$ is hydrogen atom or methyl group, $R^2$ is an alkyl group having 1 to 20 carbon atoms, and m is a number of 1 to 30; and
(v) at least one a styrenic macromer (E);
wherein the monomer (A) is present in an amount of from 5 to 45 % by weight in the water-insoluble vinyl polymer, the monomer (B) is present in an amount of from 3 to 40% by weight, the monomer (C) and the macromer (E) are present in a total amount of from 15 to 87% by weight, and the monomer (D) is present in an amount of from 5 to 35% by weight, wherein % by weight is based on the total weight of the water-insoluble vinyl polymer.

12. The water-based ink according to claim 11, wherein the colorant is a pigment or a hydrophobic dye.

13. The water-based ink according to claim 11, wherein the monomer (C) is at least one member selected from the group consisting of styrene, α-methylstyrene, vinyltoluene and vinylnaphthalene.

14. The water-based ink according to claim 11, wherein the macromer is a styrenic macromer having a polymerizable functional group at one end.

15. The water-based ink according to claim 11, wherein the weight-average molecular weight of the water-insoluble vinyl polymer is from 3000 to 300000.

16. The water-based ink according to claim 11, wherein the polymer comprises polymerized units of polypropylene glycol mono(meth)acrylate.

17. The water-based ink according to claim 11, wherein the monomer (B) is an unsaturated carboxylic acid.

18. The water-based ink according to claim 11, wherein the polymer further comprises polymerized units of a polyethylene glycol mono(meth)acrylate.

19. The water-based ink according to claim 11, wherein the polymer comprises polymerized units of polypropylene glycol mono(meth)acrylate; methacrylic acid; styrene; a styrenic macromer; and polyethylene glycol monomethacrylate.

20. The water-based ink according to claim 19, wherein the water insoluble vinyl polymer comprises polymerized units of a polypropylene glycol monomethacrylate of formula (I) having n=9.

21. The water-based ink according to claim 20, wherein the water insoluble vinyl polymer comprises polymerized units of polyethylene glycol monomethacrylate of formula (IV) having m=23.

22. The water-based ink according to claim 20, wherein the water insoluble vinyl polymer comprises polymerized units of polyethylene glycol monomethacrylate of formula (IV) having m=9.

23. The water-based ink according to claim 11, wherein $R^2$ is an methyl group.

* * * * *